July 29, 1947.  A. D. PENTZ  2,424,707

HYDRAULIC COUPLING WITH CHANGEABLE VOLUME OF WORKING FLUID

Filed June 21, 1943   2 Sheets-Sheet 1

INVENTOR.
Albert D. Pentz,
BY Alexander Chessin
his ATTORNEY.

July 29, 1947. A. D. PENTZ 2,424,707
HYDRAULIC COUPLING WITH CHANGEABLE VOLUME OF WORKING FLUID
Filed June 21, 1943 2 Sheets-Sheet 2
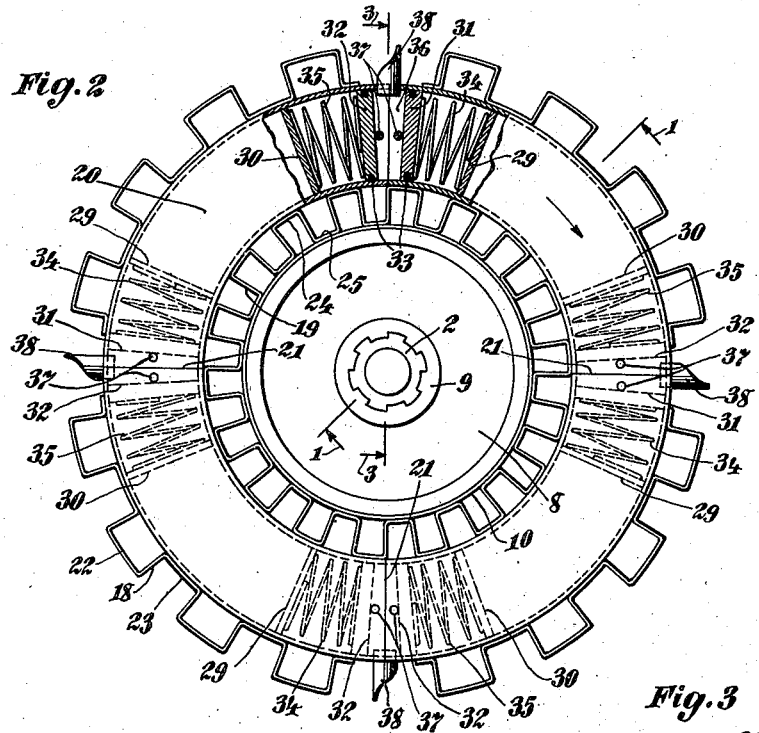
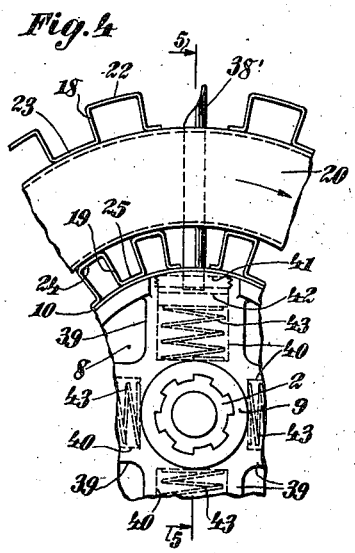
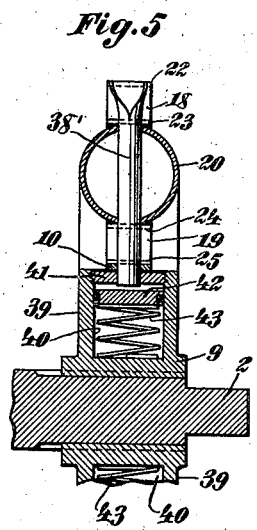
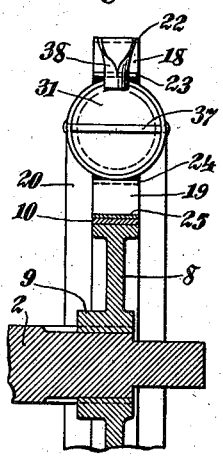
INVENTOR.
Albert D. Pentz,
BY Alexander Chessin
his ATTORNEY.

Patented July 29, 1947

2,424,707

UNITED STATES PATENT OFFICE 2,424,707

HYDRAULIC COUPLING WITH CHANGEABLE VOLUME OF WORKING FLUID

Albert D. Pentz, Staten Island, N. Y.

Application June 21, 1943, Serial No. 491,633

4 Claims. (Cl. 60—54)

The present invention is concerned with hydraulic couplings and, more particularly, with such couplings for power transmission in automotive vehicles.

It is a well known fact that power slippage in hydraulic couplings is at a minimum when the coupling is completely filled with the fluid used for the circulating medium, and that this slippage tends to increase as the volume of the fluid in the coupling decreases and the coupling is only partially filled. Considering, at the same time, that, at the start of operation, the power is more easily and smoothly transmitted when the slippage is substantial and that, at the height of operation, transmission of power is the more efficient the smaller the slippage, it follows that the desirable condition for effective operation is to start with an incompletely filled coupling and increase the volume of the fluid in circulation as the operation proceeds to its higher stages. It is one of the main objects of the present invention to produce a coupling which satisfies this condition. With this object in view, the coupling forming the subject of the present invention operates with a changeable volume of the working fluid, this volume being controlled by the fluid pressure on one side and by the velocity of the driven elements of the mechanism on the other. It is also an object of the present invention to provide a coupling which allows a degree of slippage commensurate with the load condition, the slippage, high at the start, gradually decreasing as the inertia of the load is overcome. Conformity of the slippage with the requirements of the moment is not restricted to the starting stage of operation, or full speed operation, but is in effect throughout the transmission at all of its stages, so that whenever a change occurs either in the load characteristics or in the differential velocity of the driving and the driven elements of the mechanism, a corresponding change in the volume of the working fluid takes place. It is further an object of the present invention to provide one or more transient reservoirs connected by passages with the path of the working fluid, together with means for automatically drawing the fluid out of circulation into these transient reservoirs and forcing it back into circulation again, as operating conditions may determine. It is also an object of the present invention to utilize the centrifugal forces due to the rotation of the driven elements of the mechanism to restore the withdrawn fluid to its normal circulation. It is a further object of the invention to properly allocate the withdrawal and the restoring of the fluid to coordinate these operations with the helical path of the working fluid. Other objects will become apparent from the specification which follows and from the accompanying drawing, in which:

Figure 2 is a side elevational view of the runner of the fluid coupling shown in Figure 1, at an enlarged scale.

Figure 3 is a cross section taken along the line 3—3 of Figure 2.

Figure 4 is a view similar to Figure 2, but for a modified form of the invention, only partially shown.

Figure 5 is a cross section taken along the line 5—5 of Figure 4.

Figure 1:
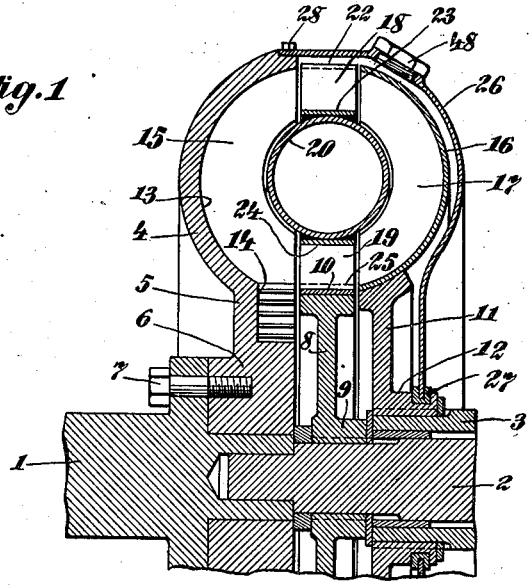
Figure 1 is an axial cross sectional view of a hydraulic coupling embodying the present invention, taken along the line 1—1 of Figure 2.

Referring to the figures in detail, 1 is the end of the driving shaft of a motor vehicle; 2 is an intermediate shaft piloted in the shaft 1; 3 is a hollow shaft or sleeve on shaft 2, connected to the driven or tail shaft (not shown) of the vehicle and rotatable therewith.

The hydraulic coupling comprises an impeller 4 having a web 5 and a hub 6, the latter being secured to the shaft 1, as by means of bolts 7; a runner having a web 8 and a hub 9 splined to the shaft 2; and an impelled member having a web 11 and a hub 12 splined to the hollow shaft 3. The impeller 4 is formed with an annular recess or pan 13 communicating with the recess 14 defined by the web 5 and hub 6 of the impeller 4. Radially extending blades 15 are mounted on the pan 13. On the web 11 is mounted an annular pan 16 carrying a plurality of blades 17 which may, though they need not, be similar in form, number and disposition to the blades 15. The web 8 has an annular rim 10, to which are secured the lower portions 19 of the runner blades 18—19, supporting a torus tube 20 between the portions 18 and 19 of the blades. The torus tube 20 is here shown as made up of four sections welded together or otherwise sealingly secured to one another, as indicated, along the lines 21. The runner blades are formed by ruffling two metal sheets, one into a succession of alternately reversed U-shaped units 18—22—18, and 18—23—18, and another one into a succession of similarly formed units 19—24—19, and 19—25—19, the elements 18 and 19 forming the two portions of the runner blades, and the elements 23 and 24 forming the surfaces between which the torus tube 20 is supported. The elements 25 are secured to the rim 10 of the runner.

The impeller blades 15, runner blades 18—19, and impelled blades 17 are all operating within an oil reservoir defined by the impeller 4 and a wall 26 sealingly secured to the impeller at 28, and to the hub 12 of the impelled member at 27, the latter, of course, rotatably. In each one of the four sections of the torus tube 20, partition walls 29 and 30 are fixedly set up. Between these partitions operate the disk like pistons 31 and 32, provided with sealing rings 33. The pistons 31 and 32 operate through the springs 34 and 35. Stop pins 37 limit the movement of these pistons, defining a space 36 into and out of which the circulating fluid may flow through a scoop 38.

In the modification illustrated in Figure 4, the chambers for the admission of the withdrawn fluid are not situated in the torus tube, as in Figure 2, but outside of it. The chambers in this modification of the invention, designated by the numeral 40, are formed in a thickened portion 39 of the web 8. The scoop 38' in this case penetrates the closure 41 of the chamber 40, the pressure of the working fluid entering through the scoop 38' being exerted on pistons 42 against the action of springs 43 resting on the bottom of the chambers 40, as well as against the centrifugal force due to the rotation of the runner shaft.

Figures 6, 7, 8:
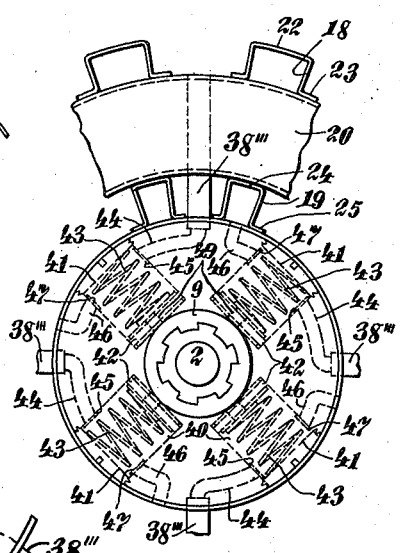
Figure 6 is a view similar to Figure 4 for still another modification of the invention.
Figure 7 is a variant of the device shown in Figure 6.
Figure 8 is a detail of the valves in the chambers of Figure 7.

In the modification illustrated in Figure 6, the chambers 40 are arranged as in Figure 4, but the action of the pistons is different. Here, the fluid passes through the scoops 38'' and ducts 44 into the chambers 40, filling them, when the runner shaft is at rest or rotates very slowly, and when the speed of rotation of the runner shaft is high enough to overcome the resistance of the springs 43, the sealed pistons 42, acted upon by the centrifugal force of this rotation, expel the fluid from the chambers 40 back into circulation. This action tends to produce a vacuum in the chambers 40. When the speed of rotation of the runner shaft decreases to a point where the centrifugal force is insufficient to hold the pistons 42 up against the pressure of the springs 43, fluid will be sucked into the chambers 40 from the volume in circulation.

Instead of the open mouth scoop 38'', a duct like the duct 38''' in Figure 7 may be used in the arrangement shown in Figure 6, i. e. one with an opening flush with the surface of the elements 23.

In connection with the last one of the variants shown in the drawing, namely, Figure 7, it should be remembered that the normal circulation of the fluid proceeds along a helical path, the liquid flowing from the impeller blades to the impelled blades over the torus tube 20, and from the impelled blades back to the impeller blades under the torus tube 20. Therefore, the entry of the fluid into the transient reservoirs and the exit of this fluid from the transient reservoirs should preferably be so allocated that the fluid is drawn out of circulation into the reservoirs 40 from over the torus tube, and expelled from these reservoirs back into circulation under the torus tube. This is shown in Figure 7, wherein the fluid is drawn into the reservoirs 40 through the duct 38''', 44, an inlet valve for this purpose being schematically shown at 45 in this duct, through which the fluid may enter but can not be withdrawn, the withdrawal being effected through the ducts 46 and outlet valves schematically shown at 47, through which the fluid may be expelled but not drawn in. The actual formation of the valves 45 and 47 is illustrated in Figure 8. The scoop form of the entry duct is omitted in this case, the entry duct 38''' having an opening flush with the surface of the elements 23.

Before operation, in the case of such devices as are shown in Figures 6 and 7, it is necessary to empty the transient reservoirs 40 of air. The procedure is as follows. Before filling the coupling with oil, the pistons 42 are pressed down to the bottom of the chambers 40 by the springs 43, the air from under the pistons escaping through the outlet valves schematically shown at 49 into the chambers 40 above the pistons 42. Next, the main reservoir of the coupling is filled with oil in the usual manner, through the filler plug hole 48. However, the coupling is not filled completely, for a reason that will presently transpire. Next, the coupling is given a rotational impulse high and long enough to cause the pistons 42 to rise to the top of the chambers 40, under the action of the centrifugal force generated by the rotation of the coupling. This will expel the air, together with whatever small amount of oil may have filtered into the chambers 40 when the main reservoir was being filled, into the not quite completely filled main reservoir, a vacuum being thereby created in the transient reservoirs 40. The rotation of the coupling is now stopped. This will cause the pistons 42 to be pressed down again to the bottom of the chambers 40 under the action of the springs 43, and oil will be drawn into the air evacuated chambers 40 from the main reservoir. By repeating this operation, the air bubble in the main reservoir may be reduced and additional oil pumped into it, so as to fill the main reservoir as completely as possible.

After this operation of filling the coupling with oil has been completed, the transfer of oil back and forth between the main reservoir and the transient reservoirs proceeds automatically. Whenever the rotational velocity of the runner shaft falls below a predetermined figure, the centrifugal force ceases to act on the pistons 42, and oil is drawn into the transient reservoirs from the main reservoir, and whenever the rotational velocity of the runner shaft increases above said predetermined figure, the fluid is again expelled from the transient reservoirs back into the main reservoir.

The arrangement of the hydraulic coupling shown in Figures 6 and 7 has an important advantage, namely, in this case, the location of the transient reservoirs may be chosen at will to meet various conditions in a most convenient manner, provided only that the transient reservoirs communicate with the working fluid, and that they rotate with the runner shaft or that their pistons are subject to the action of the centrifugal force generated by the rotation of the runner shaft, directly or indirectly.

In the embodiments illustrated in Figures 2 to 5, the transfer of the fluid between the main and the transient reservoirs also proceeds automatically, but the control of such transit is somewhat different. Thus, in the embodiment shown in Figures 2, 3, the fluid is withdrawn into the transient reservoirs whenever pressure of the circulating fluid exceeds the opposing force of the springs 34 and 35, and is returned to the main reservoir when the fluid pressure is sufficiently diminished. In the case of the arrangement shown in Figures 4, 5, the fluid is withdrawn from the main reservoir into the transient reservoirs whenever the pressure of the circulating fluid exceeds the combined opposing force of the springs 43 and the centrifugal force generated by the rotation of the runner shaft, and is returned to the main reservoir when the pressure of the working fluid in the main reservoir has fallen below a predetermined amount. Here control of the transfer of the fluid is exercised by both, fluid pressure and rotational velocity of the runner shaft.

Even in the case of the embodiments shown in Figures 6 and 7, the pressure of the circulating fluid is a factor in the flow of the fluid between the main and the transient reservoirs. If, for instance, it should happen that the pressure of the circulating fluid exceeds the pressure of the centrifugal force generated by the rotation of the runner shaft on the pistons 42, no fluid will be withdrawn from the transient reservoirs into the main reservoir, or these opposing forces may be so related that an equilibrium may be established between them when the transient reservoirs are only partially emptied of fluid. In general, as was stated in the preamble, the transfer of the fluid between the main and the transient reservoirs is controlled, on one side, by the pressure of the circulating fluid and, on the other, by the rotational velocity of the rotating elements of the mechanism.

Allowing for modifications not specifically mentioned or described herein above, modifications which are, of course, possible and obvious to those versed in the art, without transgressing the spirit and the scope of the present invention, the invention may be adequately expressed in the following claims.

I claim:

1. A hydraulic coupling between shafts of a mechanism, including a runner connected with one of said shafts for rotation therewith, a circulating fluid, a tubular ring forming a part of said runner for shaping the course of said fluid, a closed chamber acting as a transient reservoir for said fluid, a piston operating in said chamber and subject to the centrifugal force created by the rotation of said runner shaft, a spring in said chamber operating on said piston in opposition to said centrifugal force, a passage for the admission of said fluid through said tubular ring into said chamber, an inlet valve in said passage, a second passage for the withdrawal of said fluid from said chamber, and an outlet valve in said second passage.

2. A hydraulic coupling according to claim 1, wherein the coupling has a multiplicity of closed chambers disposed around the runner shaft, these chambers being similar to the closed chamber described in claim 1.

3. In a hydraulic coupling, a circulating fluid, an impeller, an impelled member, at least one transient reservoir intermediate said impeller and said impelled member, a passage connecting said reservoir with that portion of the path of the circulating fluid where it flows from said impeller to said impelled member, an inlet valve in said passage, a second passage connecting said reservoir with that portion of the path of the circulating fluid where it flows from said impelled member back to said impeller, and an outlet valve in said second passage.

4. A hydraulic coupling according to claim 3, wherein the coupling has a plurality of reservoirs disposed around the axis of the coupling, said reservoirs being similar to the reservoir described in claim 3.

ALBERT D. PENTZ.

REFERENCES CITED

The following references are of record in the file of this patent:

UNITED STATES PATENTS

| Number | Name | Date |
| --- | --- | --- |
| 1,859,607 | Sinclair | May 24, 1932 |
| 1,910,696 | Kiep | May 23, 1933 |
| 1,972,175 | Vessey | Sept. 4, 1934 |
| 2,127,738 | Kugel | Aug. 23, 1938 |
| 2,265,107 | Sinclair | Dec. 2, 1941 |
| 2,289,440 | Kugel | July 14, 1942 |
| 2,299,883 | Dunn | Oct. 27, 1942 |
| 2,304,721 | Werther | Dec. 8, 1942 |
| 2,368,725 | Pentz | Feb. 6, 1945 |

FOREIGN PATENTS

| Number | Country | Date |
| --- | --- | --- |
| 656,788 | France | 1929 |
| 385,086 | Great Britain | 1932 |